(No Model.)
W. C. NORTH & S. W. SESSIONS.
BOLT.
No. 519,411. Patented May 8, 1894.
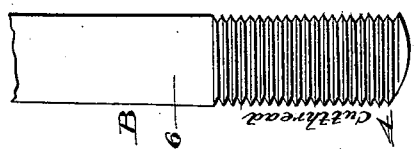
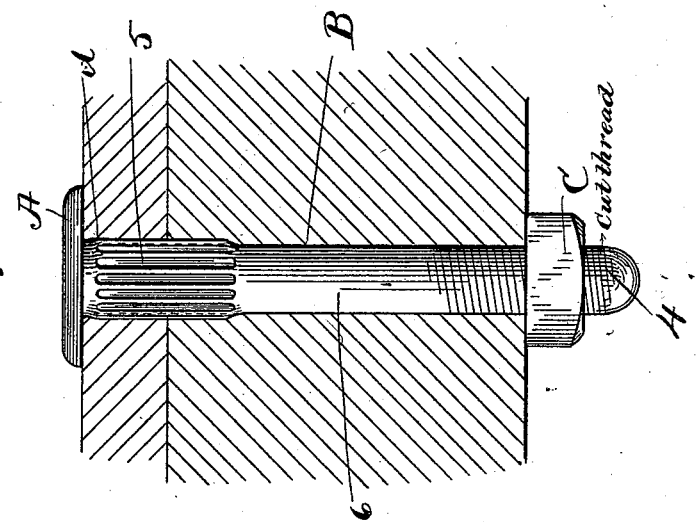
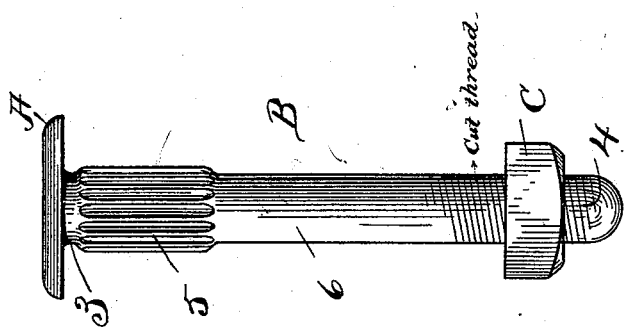
Witnesses:
E. Byron Gilchrist
Inventors
William C. North
and
Samuel W. Sessions
By Seggett & Seggett
their Attorneys

UNITED STATES PATENT OFFICE.

WILLIAM C. NORTH AND SAMUEL W. SESSIONS, OF CLEVELAND, OHIO.

BOLT.

SPECIFICATION forming part of Letters Patent No. 519,411, dated May 8, 1894.

Application filed March 4, 1892. Serial No. 423,732. (No model.)

*To all whom it may concern:*

Be it known that we, WILLIAM C. NORTH and SAMUEL W. SESSIONS, of Cleveland, in the county of Cuyahoga and State of Ohio, have invented certain new and useful Improvements in Bolts; and we do hereby declare the following to be a full, clear, and exact description of the invention, such as will enable others skilled in the art to which it pertains to make and use the same.

Our invention relates to improvements in bolts, the object being, first, to produce a bolt that is strong and durable, and that will not be liable to become loose in the bolt-hole, from screwing up the nut, jarring of the parts, or other cause, and, secondly, to produce a bolt that is equally adapted for use in metal and wood.

With this object in view, our invention consists, in certain features of construction, hereinafter described and pointed out in the claim.

In the accompanying drawings, Figure 1 is an elevation of a bolt embodying our invention. Fig. 2 is an elevation of the same showing its application, the bolt in both figures being shown enlarged to more clearly show the construction, and Fig. 3 is an enlarged detail.

A represents the head of the bolt and B the shank. The shank is provided at its free end with threads 4 which threads are cut on the end of the shank because the object to be attained is to produce a bolt in which the smooth and threaded portion of the shank shall be of the same diameter. This can be attained by cutting the threads in the stock. This constitutes one of the essential features of my invention. Another feature consists in the longitudinal ribs 2 and the peculiarity of their construction. They are rolled in the bolt and formed from the same stock in the shank which constitutes the remainder of the shank and the ribs are entirely formed by the displacement of the contiguous metal so that while the ribs project beyond the surface of the remaining portion of the shank and the diameter at this point is greater than the diameter at any other portion of the shank, yet the amount of metal is the same, the ribs being entirely formed from the stock. By this means we are enabled to drive the bolt into a hole in metal as well as wood having a hole of such size that it will receive the threaded and smooth portion of the bolt with the usual clearance. A bolt thus constructed will hold fast when driven home, will not work loose, its ribs will become embedded in the wall of the hole whether the material be wood or metal and the bolt will hold just as well in a round hole as in any other shaped hole.

Whether used in wood or metal the bolt-hole made for receiving the bolt is made just large enough to receive the screw-threaded portion of the shank of the bolt so that when the bolt is driven the ribs of the ribbed portion will more or less embed themselves in the surrounding wall of the bolt-hole, as aforesaid, and prevent the latter from turning or becoming loose. The application of the bolt shown in Fig. 2, however is, in metal. The ribbed portion of the bolt being larger in diameter than the bolt-hole, a portion of the material or stock of the ribs is, of course, displaced into the recesses intervening between the ribs, but a portion of the material or stock displaced is also sheared or upset, as the case may be, against the plain and reduced portion of the shank of the bolt immediately above the ribbed portion of the shank; hence said plain or reduced portion of the shank of the bolt should be of such diameter and size relative to that of the ribbed portion of the shank of the bolt that said plain or reduced portion will, in driving the bolt, accommodate whatever material will be sheared or upset, or displaced, against said reduced portion, and at the same time permit the bolt to be driven so that the head thereof will abut the adjacent surface of the piece or object into which the bolt is driven.

Referring to Fig. 2, the bolt-hole is shown in dotted lines at the ribbed portion of the shank of the bolt and hence the manner in which the ribs more or less embed themselves in the surrounding wall of the bolt-hole, will be readily observed. Also, is shown, as at *d*, the material or stock that is sheared or upset, or displaced, against the reduced portion immediately above the ribbed portion of the shank of the bolt.

We are aware that bolts have heretofore been made with the shanks thereof partly fluted and partly plain, but with the fluted portion of approximately the same diameter as the screw-threaded portion of the bolt, or provided with a square portion between the fluted portion and the head of the bolt. Such bolts were objectionable because they were liable to turn in screwing up the nut or to become loose from jarring or other cause, or were not sufficiently adequate or serviceable for all purposes.

By our improved construction, as already observed, there is no possibility of the bolt becoming loose or being turned in the bolt-hole; the bolt is strong and durable and equally adapted for use in wood and metal; the bolt is adapted to be driven into either square or round holes, in wood or metal, and in all cases, will be securely held from turning in the bolt-hole.

What we claim is—

A bolt comprising a head and shank having screw threads cut on the end opposite the head, a portion of the remainder of the shank constructed with longitudinal ribs located a short distance from the head and formed by the displacement of a portion of the stock constituting the shank, leaving a space between the head and ribs of less diameter than the latter, substantially as described.

In testimony whereof we sign this specification, in the presence of two witnesses, this 31st day of December, 1891.

WILLIAM C. NORTH.
SAMUEL W. SESSIONS.

Witnesses:
C. H. DORER,
WARD HOOVER.